G. HAMMETT.
PHONOGRAPHIC ATTACHMENT FOR MOTION PICTURE MACHINES.
APPLICATION FILED NOV. 14, 1908.
926,940.
Patented July 6, 1909.
2 SHEETS—SHEET 1.
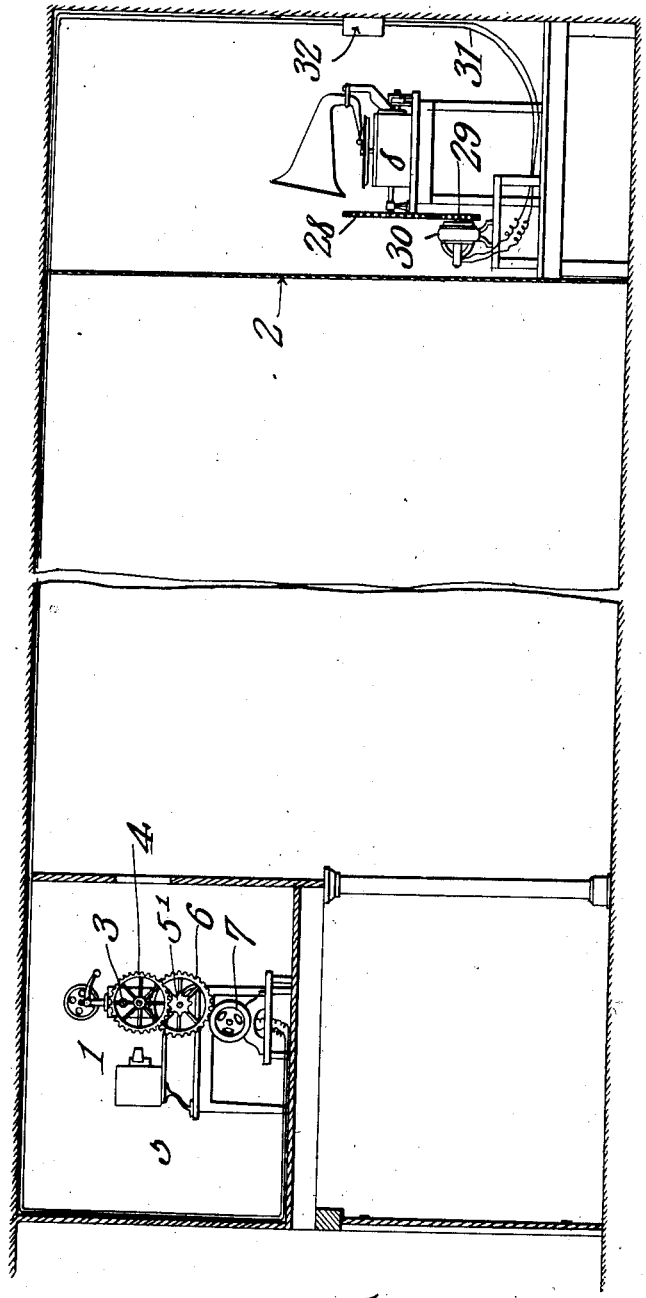
Witnesses
Inventor
George Hammett.
By C. A. Snow & Co.
Attorneys G. HAMMETT.
PHONOGRAPHIC ATTACHMENT FOR MOTION PICTURE MACHINES.
APPLICATION FILED NOV. 14, 1908.
926,940.
Patented July 6, 1909.
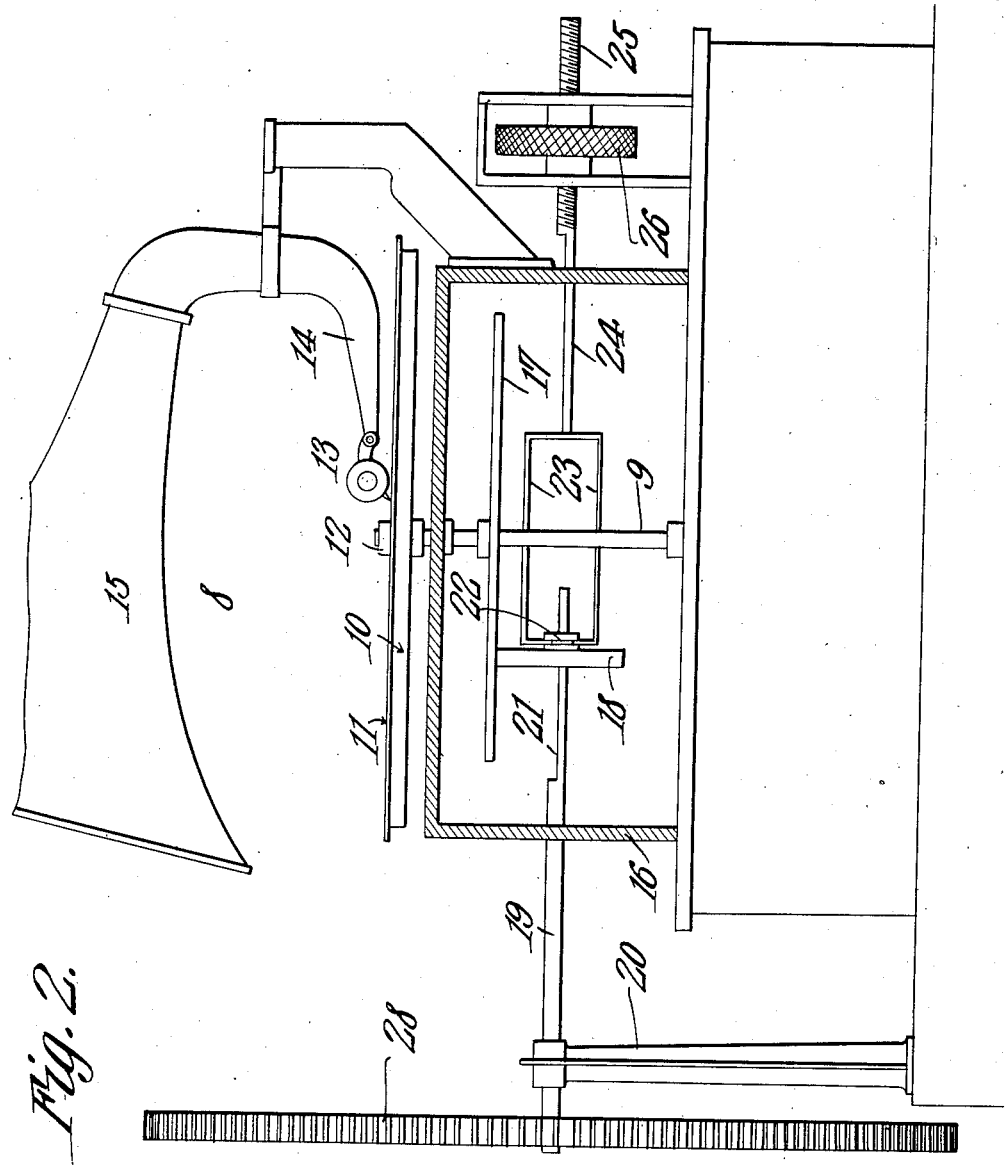

UNITED STATES PATENT OFFICE.

GEORGE HAMMETT, OF BUTTE, MONTANA.

PHONOGRAPHIC ATTACHMENT FOR MOTION-PICTURE MACHINES.

No. 926,940.     Specification of Letters Patent.     Patented July 6, 1909.

Application filed November 14, 1908. Serial No. 462,648.

*To all whom it may concern:*

Be it known that I, GEORGE HAMMETT, a citizen of the United States, residing at Butte, in the county of Silverbow and State of Montana, have invented a new and useful Phonographic Attachment for Motion-Picture Machines, of which the following is a specification.

This invention has reference to improvements in phonographic attachments for motion picture machines, and its object is to provide a phonographic attachment for producing speech, music or other sound to accompany and make more realistic the motion pictures.

In the following description the term phonograph or phonographic is used in the broader sense, being intended to designate the reproduction of sound from a record thereof and not any particular type of reproducing machine.

The invention is designed to utilize either the disk type of reproducing machine or the cylinder type as may be desired.

The present invention supplies the lack of realism present in silent motion picture machines by providing a means whereby appropriate sounds may be produced in proper relation to the screen upon which the motion pictures are projected, which sound should be in absolute or practically absolute synchronism with the apparent movement of the motion pictures. The illusion is of course lost if there is any lack of coincidence between the reproduced sounds and the motions apparently taking place upon the screen.

By the present invention the synchronizing of the motion picture machine and the sound reproducing machine is insured and both the motion picture machine and the sound reproducing machine are under the control of the operator of the said motion picture machine, and since the operating mechanism of the motion picture machine and parts coacting therewith are markedly heavier than the sound reproducing machine and the parts actuating the same, it follows that the control of the sound reproducing machine is very sensitive to the movements of the motion picture machine.

The invention will be best understood from a consideration of the following detail description taken in connection with the accompanying drawings forming a part of this specification, in which drawings, Figure 1 is a longitudinal and partially schematic section through an exhibition hall for motion pictures showing the relative arrangement of the motion picture machine and the sound reproducing machine and the connecting parts. Fig. 2 is a side elevation partially in section of the sound reproducing member, on a larger scale than shown in Fig. 1.

Referring to the drawings and more particularly to Fig. 1 there is shown a motion picture machine at 1 for projecting views upon a screen 2 from the usual film, the operating means being shown in the drawings as a crank 3 used to drive a suitable mechanism for carrying the pictures upon the film in succession past the beam of light thrown on the screen 2, all in the usual manner. The crank 3 is fast to a gear wheel 4, the shaft of which is assumed to be connected to the film actuating mechanism, inclosed in a suitable casing 5, but since it forms no part of the present invention and is of any approved type, such film actuating mechanism is not shown in the drawings.

The gear wheel 4 is in mesh with a pinion 5' upon a shaft carrying a double gear wheel 6 and the said gear wheel 6 is in mesh with a suitable gear wheel upon the armature shaft of a dynamo or other suitable electric generator 7. Since this generator need develop but a comparatively small current it may be of small size and may be readily driven by the operator in the act of actuating the film to project the motion pictures upon the screen 2.

Adjacent to and preferably behind the screen 2 is located a sound reproducing machine 8, illustrated in the drawings as of the familiar taper arm type using the disk style of sound record tablet. It is to be understood however that the cylinder type of machine may be used as well as the disk type.

The driving mechanism for the sound reproducing machine is best shown in Fig. 2. There is an upright shaft 9 fixed against movement except upon its longitudinal axis and at the upper end of the shaft there is made fast thereto a turntable 10 for the reception of a record disk tablet 11 of any desired make. The tablet is secured to the table 10 by a nut applied to the upper threaded end of the shaft 9 after the usual manner. Sound is reproduced from the tablet through a suitable sound box 13 at the end of the swinging taper sound amplifying horn 14 which latter leads into an amplifying horn 15 all in a manner familiar in the art of reproducing sound, the particular machine shown being a well known form of sound reproducing machine.

Below the turn table 10 the shaft 9 is housed within a suitable casing 16 provided for the protection of certain of the driving mechanism from dust or other harm. The shaft 9 within the casing 16 carries a disk 17 with which there is in engagement a friction drive wheel 18 mounted on a shaft 19 having bearings in the casing 16 and in a pedestal 20 erected on a suitable support. Within the casing 16 the shaft 19 is flattened for a portion of its length and receives the friction disk 18 which latter has an axial passage similar in shape to the cross sectional shape of the shaft at the flattened portion 21 thereof, so that the disk or wheel 18 is constrained to rotate with the shaft but is permitted to move longitudinally thereon. The friction wheel 18 is provided with a hub 22 having an annular groove therein, and this groove is entered by the free ends of a forked member 23 on one end of a rod 24 extending through the side of the casing 16. This rod is flattened for a portion of its length where it extends through the casing 16 so that while it may be moved longitudinally it cannot be rotated. The outer end of the rod is screw threaded as indicated at 25 and receives a milled wheel 26 confined in a suitable frame 27 so that the milled wheel may be rotated by hand to cause a longitudinal movement of the rod 24 without rotation of the latter. By this means the friction wheel 18 may be caused to move along the shaft 21 in a line radial to the axis of rotation of the shaft 9 so as to engage the disk 17 at a greater or less distance from its axis of rotation. By this means the speed of rotation of the turntable 10 may be very accurately determined under a constant speed of the shaft 19.

Upon the shaft 19 there is secured a gear wheel 28 and this gear wheel is in mesh with another gear wheel 29 upon the armature shaft of a motor 30 the latter being connected by conductors 31 to the dynamo 7, the said conductors being carried in any convenient manner from the motor 30 to the dynamo 7, preferably out of sight of the audience. In order to adjust the system the conductors 31 may include a suitable rheostat 32.

Now let it be assumed that the record tablet 11 is suitably marked so that the reciprocating stylus may be placed accurately thereon. This marking may be done in various known ways as by placing an indicating mark in the margin of the record tablet or a notch at the same place or increasing the depth of the initial portion of the record groove, the latter being a satisfactory method of indicating the commencement of a record without danger of throwing the reproducing stylus out of the record groove by a sudden starting of the tablet, it being advantageous for the record tablet to be brought to speed in the shortest possible time. Let it further be assumed that the circuit between the dynamo generator and the motor has been so adjusted that at a certain speed of the motor generator the motor will develop sufficient power to drive the reproducing machine at the proper speed, and let it be still further assumed that the relation between the driving wheel 18 and the disk 17 has been properly adjusted to establish the speed of rotation of the turntable 10 and record tablet thereon at a certain speed of the shaft 19.

Now the reproducing stylus is placed upon the commencement of the record tablet groove and the film in the projecting machine is properly located. By applying power to the crank 3 the motion picture film is actuated and the dynamo 7 is very quickly brought to speed. The motor 30 responds to the impulses sent over the conductors 31, and since the force necessary to drive the talking machine structure is but small, the said structure is very quickly brought to speed.

By the means provided it is an easy matter to so adjust the two machines and the parts operated thereby that practically absolute synchronism is established between the motion pictures thrown upon the screen 2 and the sounds emitted by the sound reproducing machine back of said screen and the illusion that the sounds are actually produced in the motion pictures themselves is very marked.

The necessity of coincidence between the emitted sounds and the projected pictures is of course apparent. Should the motion picture machine and the sound reproducing machine get out of step the illusion would be at once dispelled.

For reasons which need not be entered into here the motion picture machines are propelled by hand and are directly under the control of the operator. The motion picture machines are quite bulky and therefore possess considerable inertia. The sound reproducing machines may be made quite light, especially when driven by an electric motor which will respond quickly to any change in the current on the line. For this reason the propelling means for the motion picture film is coupled up to a dynamo generator which may be built to furnish the proper current to the conductors 31, and the motor 30 may be built to respond to such current. By this means the sound reproducing machine is made very sensitive to any variations in the speed of actuation of the motion picture film.

The motion picture machine being comparatively bulky will not readily respond to changes in the impulses given by the operator and the result is that the motion picture machine will run fairly steadily, but since the sound reproducing machine may be so light as to have comparatively little inertia and therefore be readily responsive to changes in speed of the motor 30, which latter in turn is readily responsive to changes in speed of the generator 7, any changes in speed of the motion picture machine are immediately responded to by the sound reproducing machine and the two machines remain always in step one with the other, this being due to the preponderance in weight of the motion picture structure.

For the taking of motion pictures the sounds may be recorded by replacing the reproducing machine with a suitable sound recording machine and the pictures will then agree. Since practically true synchronism between the projection apparatus and the sound reproducing apparatus is possible with the present invention, pictures taken and sounds recorded as stated may be faithfully reproduced.

What is claimed is:—

1. A motion picture apparatus comprising a motion picture projection machine, an electric generator driven thereby, a sound reproducing machine, an electric motor coupled to said sound reproducing machine for driving the same, and an electric circuit coupling the electric generator to the sound reproducing machine.

2. A motion picture apparatus comprising a motion picture machine, an electric generator driven thereby, a sound reproducing machine of small inertia compared with the motion picture machine, an electric motor coupled to said sound reproducing machine for driving the same, and an electric circuit coupling the electric generator to the sound reproducing machine.

3. A motion picture apparatus comprising a motion picture machine, an electric generator coupled mechanically directly thereto, a sound reproducing machine of small inertia compared with the motion picture machine, an electric motor responsive to the current furnished by the electric generator, said motor being coupled to the sound reproducing machine for driving the latter, and an electric circuit coupling the electric generator to the sound reproducing machine.

4. In a motion picture apparatus, a motion picture machine, an electric generator coupled to the driving mechanism of the motion picture machine and driven thereby, a sound reproducing machine, an electric motor in circuit with the generator and connected to the sound reproducing machine for driving the latter, and means for varying the speed of the sound reproducing machine without varying the speed of the motor.

In testimony that I claim the foregoing as my own, I have hereto affixed my signature in the presence of two witnesses.

GEORGE HAMMETT.

Witnesses:
CHARLES ALFRED DAVIS,
JNO. W. DUNCAN.